Jan. 16, 1968 T. EEK 3,364,101
METHOD AND APPARATUS FOR THE AGGLOMERATION OF RESINS
AND CRILLS IN THE PRODUCTION OF PAPER PULP
Filed Oct. 24, 1966 2 Sheets-Sheet 1

INVENTOR

Terje Eek

BY Stevens, Davis, Miller & Mosher

ATTORNEYS

Jan. 16, 1968  T. EEK  3,364,101
METHOD AND APPARATUS FOR THE AGGLOMERATION OF RESINS
AND CRILLS IN THE PRODUCTION OF PAPER PULP
Filed Oct. 24, 1966  2 Sheets-Sheet 2

INVENTOR
Terje Eek
BY *Stevens, Davis, Miller & Mosher*
ATTORNEYS

United States Patent Office 3,364,101
Patented Jan. 16, 1968

3,364,101
METHOD AND APPARATUS FOR THE AGGLOMERATION OF RESINS AND CRILLS IN THE PRODUCTION OF PAPER PULP
Terje Eek, Vienna, Austria, assignor to A/S Niro Atomizer, Soborg, Denmark
Continuation-in-part of application Ser. No. 469,802, July 6, 1965, which is a continuation-in-part of Ser. No. 241,915, Dec. 3, 1962. This application Oct. 24, 1966, Ser. No. 600,313
Claims priority, application Denmark, Dec. 7, 1961, 4,891/61
9 Claims. (Cl. 162—12)

ABSTRACT OF THE DISCLOSURE

Particles of a size of about 5 microns and less are separated from an aqueous dispersion of fibrous material employed in the production of paper pulp. The particles are agglomerated to a size above 5 microns and are then employed in producing paper pulp.

---

This application is a continuation-in-part of copending application Ser. No. 469,802 filed July 6, 1955, now abandoned, which in turn is a continuation-in-part of Ser. No. 241,915 filed Dec. 3, 1962, now abandoned.

In the manufacture of paper it is known that the ground wood or cellulose pulp, the so-called stock suspension, besides the fibrous material contains in addition various resin particles and some very fine wood or cellulose particles which cause considerable operating difficulties. The resin particles are presumably present both freely dispersed in the liquid and adhered to the fine cellulose particles which have almost the form of leaves or discs, having a maximum dimension within the range of 2 to $5\mu$ and a thickness which is very small in relation thereto. These particles are often called "crills," and this term will be used in the following description.

Presumably, there are also resins adhered to, or otherwise connected with, the useful fibers, but these resins do not involve the difficulties which will be particularly considered in the following analysis and description:

As is well-known, in a paper-making machine, the stock suspension is applied to a so-called "Fourdrinier" or wire screen in an appropriate layer, and as soon as said suspension has been deposited upon the screen, the dewatering is commenced, the water percolating through the wire screen and leaving solid matter on said wire screen. The crills and the freely dispersed resins are for the most part capable of percolating through the stock suspension, but there is some resistance to the percolation. Accordingly, the concentration of these resins and crills increases through the layer and becomes so great at the lower part of said layer that, when the stock passes the suction boxes of the machine, a considerable resistance to the suction of water from the suspension occurs, which establishes an upper limit for the operating speed of the machine. Moreover, the paper gets different surface characteristics on two sides, and, at the same time, there is on the part of the resins, and presumably also on the rest of the crills, a tendency to stick to the threads of the wire which may gradually become choked.

A significant portion of the resins and the crills will of course, be carried away with the water. In this connection, the presence of the crills in particular, results in considerable drawbacks, since it is not possible to remove these very fine particles by means of the conventional purifying plants. Consequently, the particles are carried away with the white water most frequently to a water course, where the wood pulp or cellulose pulp constitutes an excellent and fertile soil for various noxious bacteria and other microorganisms, to the harm, or even complete destruction of the fish population of the water course. Another drawback, perhaps the most significant one, is that the water course may become completely choked.

Consequently, steps are normally taken to separate the resins and the crills from the pulp, either in connection with the method of manufacture, prior to the pulp being dried and compressed into bales for transportation, or in the paper mill, subsequent to the suspension of the pulp in water with a view to preparing the stock used for the making of paper.

Such separation results in an aqueous dispersion of resins and crills which has heretofore not been employed for any practical purpose, but which, nevertheless, out of regard for pollution problems, could not be directly discharged. Therefore, according to prior practices, it has been necessary to first concentrate the dry matter by evaporation of water, whereafter the dry matter can be burnt.

Since the initial concentration of dry matter is very low, a considerable amount of heat is required for the evaporation, and the heat generated by burning the dry matter only provides a fraction thereof. Moreover, the separated quantity of dry matter represents a considerable loss of material so that the method is uneconomical, but, nevertheless, it has been regarded as expedient to apply said method for the above reasons, and because, on removing the crills an improved paper or board quality is attainable.

An object of the present invention is to provide a more economical solution of the problems attached to the presence of said resins and crills. More specifically, it is an object of the invention to provide a method of removing the crills from the white water in an economical and simple manner.

A further object is to convert the removed crills into a useful product.

The above and other objects and advantages of the invention will become apparent from the following detailed description:

The invention consists primarily in a method where, from an aqueous dispersion of the fibers, a fraction is separated off comprising particles of resins and crills of a size within the range of about $5\mu$ or less, and the separated fraction is dried to form agglomerated particles which are practically all of a size exceeding $5\mu$.

The term "particles" is here used in the widest sense of the word, and should be so understood that after drying, the material is in the form of individual bodies of any shape ranging from filamentary to spherical bodies, and not in the form of a more or less homogeneous treacly mass.

The aqueous dispersion used as starting material may be white water where it is desired to improve the treatment thereof. Preferably, however, it is a slurry of fibers as obtained in the cellulose production previous to the bale pressing or as used in the paper mill for the final production of paper.

According to the present invention, the particles can be reintroduced into the stock suspension, without involving the drawbacks aforesaid, so that the paper-making machine may be driven at higher speeds, and so that there is no loss of material, which to a considerable extent, compensate for the heat used for the drying process.

The reason for the result attained should presumably be looked for in the fact that the resins set during the drying process, so that the particles resulting from the agglomeration process remain stable when suspended in the stock suspension.

Moreover, it is sometimes of interest to produce a certain surface character of the paper made, which may be attained by applying a suitable suspension of the agglomerated particles to the surface of the layer present on the wire, for example, subsequent to the layer having passed by the suction boxes.

It should be particularly emphasized that if the agglomeration results in particles of a size not permissible in the suspension, they may, without difficulty, be broken down to particles of a suitable size. However, it is of the very greatest importance that they really are particles. If, by way of example, a drying process is so performed as to result in a homogeneous mass, the latter will not be suitable for re-introduction into the stock suspension.

Excellent results may be obtained when the separated suspension of crills is atomized in a drying chamber, for example by the aid of a rotary atomizer, since the particles formed are appropriate for being returned directly to the stock suspension. By a suitable adjustment of the drying device, a particle size of from 25 to 100μ is attainable without difficulty.

In the atomization-drying process, it is theorized that liquid particles are created having a contents of dry matter corresponding to agglomerates which, in the dried state, have the desired size. In the drying chamber the liquid of the drops evaporates without said drops uniting, and when the balance of the liquid in a certain drop has evaporated, the temperature of the dried particle will rise so much that its contents of resin set, and thereby cement together the crills contained in the drop in question, thus forming an agglomerated particle which will be stable in the subsequent suspension in water.

If the separated fraction containing crills and resins is available as a suspension of rather low concentration, it is sometimes advantageous to evaporate the suspension to higher concentration before the material is transferred to the atomizer since this affords the possibility of using an atomization-drying apparatus of smaller dimensions. If spent cooling water or other form of excess heat is available from the plant, the said evaporation may advantageously be effected by using such excess heat for evaporation at a comparatively low temperature and a suitable vacuum.

The separation of the crills and the subsequent agglomeration and reintroduction to the pulp, may also be effected at any stage of the process prior to the introduction of the pulp into the paper machine. Thus, the separation and the introduction need not take place in conjunction with the paper making, but may be effected at the place of manufacture of the pulp, and the reintroduction need not necessarily take place while the pulp is suspended in water, but may, for example, equally well be effected subsequent to the drying process, for example, immediately before the dried material is compressed into bales. Moreover, it will appear from the above, that the reintroduction may be effected anywhere and at any time quite independently of the place of separation and agglomeration. The agglomerated product may, consequently, be transported independently of the pulp.

It should be noted that the invention does not comprise the known methods for the treatment of sulphite waste lye. This known treatment is applied to a waste material resulting from an earlier stage of the cellulose production than that in which the waste water containing crills appears.

The invention may be applied to wood pulps of any kind, mechanically ground wood pulp, as well as chemical and semi-chemical pulp of any description. Moreover, the method according to the invention may find application also in connection with other forms of paper pulp than wood pulp, for example, cellulose pulp or semi-cellulose pulp from straw, as well as paper pulp produced from rags of wool or cotton. Particularly in the last mentioned case, it may be necessary, in order to attain the intended stable agglomeration, to add settable resins or other stable adhesives prior to the drying process. This makes somewhat more expensive, but in return, the introduction of the agglomerated material to the stock suspension may have an advantageous influence, inter alia with regard to the velocity of water suction on the wire and also with regard to the texture of the finished paper or board.

As long as the separated fraction with particles of the range of about 5μ and less is to be regarded solely as waste, for the purpose of avoiding loss of desirable material, efforts should be concentrated on ensuring that said fraction contains the fewest possible larger particles not having the said detrimental effects. However, when using the present invention where the contents of dry matter of said fraction is reintroduced into the paper pulp, and, consequently, represents no loss of material, such efforts are not necessary. Sometimes it may even be expedient that the fraction contains considerable amounts of fiber particles.

In employing this procedure it is possible to control the quality of the produced paper in a heretofore unknown manner, for example, the strength and surface characteristics may be adjusted as desired quite independently of one another, when the re-introduction of the agglomerated material is effected into the suspension on the wire screen, whereby this material, as will appear from the above statements, determines the surface characteristics of the paper, while the fraction remaining after the separation, which contains coarser fibers, constitutes the interior of the paper primarily determines the strength characteristics of same. The basis of this aspect of the invention is that a separation of the paper pulp is effected in two fractions, and since the border line between the fractions can be chosen very freely without interfering with the advantages primarily attained through the invention, there should be nothing to prevent the fractionation from being effected at different times with different border lines and, consequently, at a certain production of paper, the material for the interior of the paper and for its surface may be chosen from two different charges where the fractionation has been effected with different border lines, or mixture from two or more charges may be used, where the fractionation has been effected at two or more different border lines.

The invention is illustrated in the drawing.

Figure 1:
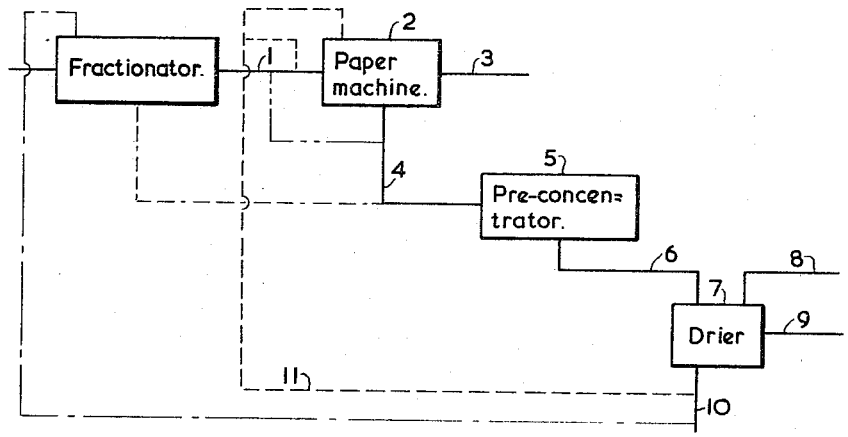
FIGURE 1 illustrates by means of a block diagram one embodiment of the invention in which crill may be removed from the white water from a paper machine.

In FIGURE 1, a suitable conventional pulp of the type described previously is lead from a pulp supply source, not shown, through a fractionator or separator in which the pulp dispersion is separated into a first fraction comprising an aqueous dispersion of solid particles which have a size greater than about 5μ, and a second fraction comprising a dispersion in water of particles or crills of a size less than about 5μ. The particles in the first fraction range up to a size of about 100μ or higher depending upon the particular pulp employed. The first fraction is lead through a line 1 to a Fourdrinier paper machine 2 from which the paper product is removed along a line 3. The waste water or so called white water is sucked off through the wire screen of the paper machine and removed via line 4. The fractionator or separator may be of the type shown in U.S. Patent No. 2,988,223 to Janson in which a pulp slurry is atomized and sprayed against strainer elements. The larger particles in the pulp do not pass through the strainer elements whereas the majority of the smaller particles, for example, those of a size less than 5μ pass through the strainer elements. The second fraction is passed to a preconcentrator 5 in which the concentration of the dispersion is increased. The preconcentrator, which may be of any known type, is preferably an apparatus consisting of a plurality of superimposed separate flotation cells in which the flotation cells slope upwardly towards the discharge side. The particles, which are made more buoyant by air bubbles, slide along the ceiling of the flotation cells while the heavier clarified water reverses its flow, drops to the floor of the cell, and passes through a perforated vertical wall into a clarified water collector. The preconcentrated crill suspension is lead through a line 6 to a drier 7. Although any suitable drier may be employed, the drier is preferably an atomization drier of known design containing a rotary atomizing wheel by which the suspension is atomized into a fine mist in a drying chamber. The mist particles are dried by a stream of hot air entering via line 8 at a temperature of about 200° C. The spent air containing water vapor is removed via exhaust line 9 at a temperature of about 60–70° C. The crills in each mist particle agglomerate into a single dried particle of a size in the order of $25\mu$ to $100\mu$ or higher and preferably between about 50 to $100\mu$, and a solids content of about 85–95% by weight.

In a typical example, a slurry of wood pulp fibers having a solids content of about 1% may be introduced into the fractionator, the principal fraction containing the dispersion of pulp particles greater than about $5\mu$ is passed to the paper machine 2 while the crills are removed as the second fraction and passed at a concentration of about 0.2 weight percent to the preconcentrator 5. The dispersion leaving the preconcentrator in line 6 may have a concentration of about 3%, and is atomized by an atomizing wheel rotating at 24,000 r.p.m. in the drier 7. Sufficient hot air as determined, for example, by a heat and material balance, is introduced through line 8 at a temperature of 200° C. to dry the mist particles to a solids content of about 95 weight percent. The cooled air and other vapors are exhausted by a line 9 at a temperature of about 70° C. The agglomerated, now discrete, particles are removed from the drier through line 10 and returned to the fractionator. Since the particles are now of a size ranging between about 25 and $100\mu$, these particles will now be removed from the fractionator via line 1 and will be employed to produce the paper leaving the paper machine via line 3. The resulting paper is characterized by greater uniformity.

It will be appreciated that some of the crills will not be separated from the larger pulp particles in the fractionator, and will be passed to the paper machine through line 1. Some such crills will be retained in the paper, however, a substantial amount of such crills will pass through the wire screen and will be withdrawn in the white water via line 4. Accordingly, line 4 may be connected to the preconcentrator 5 to recover such crills from the white water.

The agglomerated particles may also be passed via dash line 11 to the paper machine to form a surface layer upon the paper to provide a paper having useful surface characteristics.

Certain of the advantages of the invention may be obtained even in the absence of the fractionator. For example, the preconcentrator and drier may be employed to remove crills from the white water in line 4 to in effect purify the white water before it is passed to disposal. The crills recovered may be recycled either to the paper machine via line 11 or to the pulp supply via the dot dash line.

Figure 2:
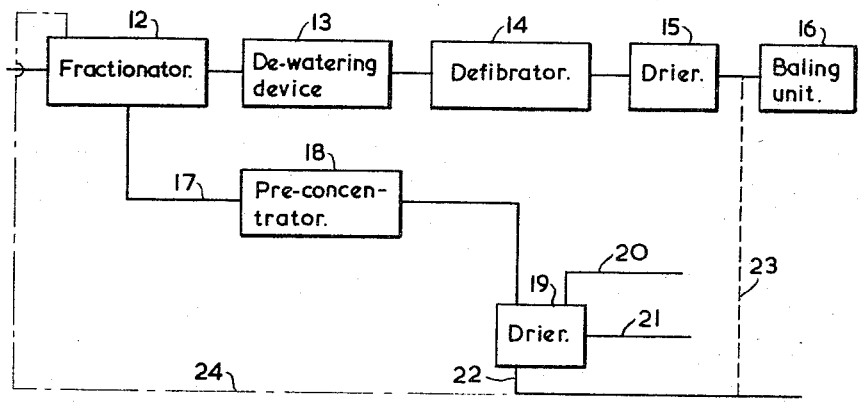
FIGURE 2 illustrates by means of a block diagram another embodiment in which the crill is removed during the cellulose production.

In FIGURE 2 is shown a part of a well-known cellulose manufacturing plant comprising a fractionator or separator 12, like the FIGURE 1 fractionator, a de-watering-press 13, and a defibrator 14, of known construction, a drier 15, for example, a flash drier, and a baling unit 16. The de-watering-press 13 may be, for example, a filter screw press.

A fraction from the fractionator containing mainly the crills is lead through conduit 17 to a preconcentrator 18, corresponding to that designated by 5 in FIGURE 1 and a drier 19 corresponding to that designated by 7 in FIGURE 1 and comprising likewise a drying air inlet 20 and a spent air take-off 21, and a take-off 22 for the agglomerated particles which may be packed or stored for further use or transported, for example, for introduction into a paper machine in the manner indicated in FIGURE 1. Further, it is possible to return the agglomerated particles to the cellulose manufacturing process, for example, as indicated by a dotted line 23 into a stage between the drier 15 and the baling unit 16, or as the case may be, to the fractionator 12 as indicated by a dot and dash line 24.

Figure 3:
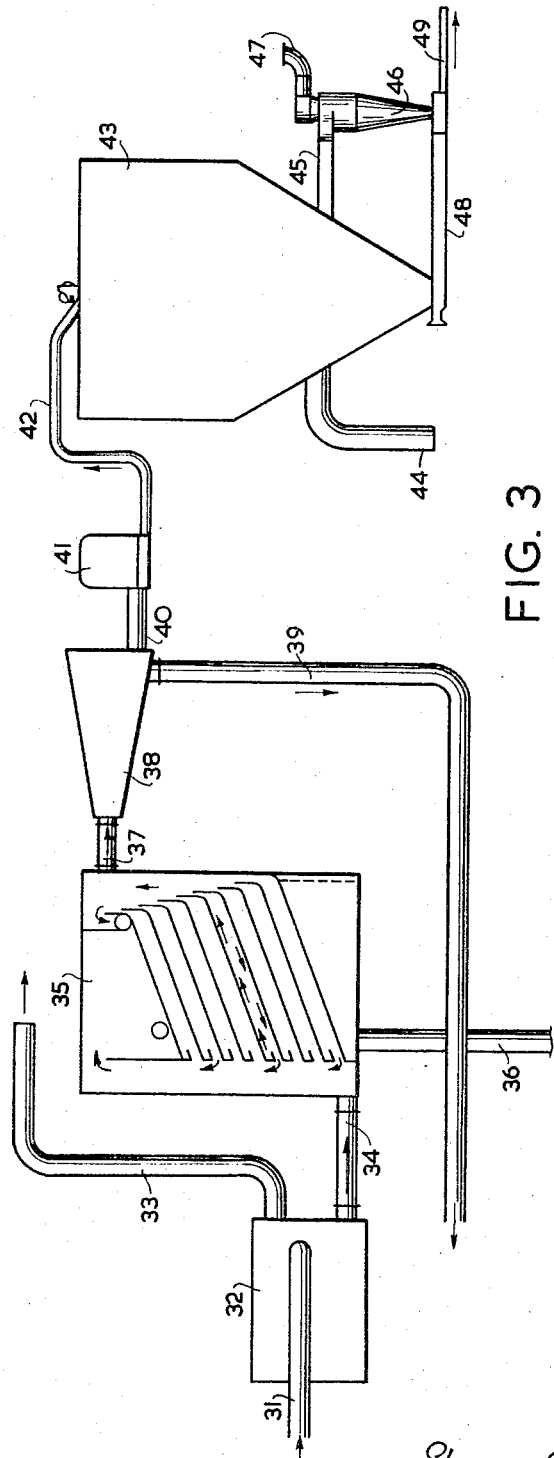
FIGURE 3 shows a more detailed scheme of a plant for carrying out the invention.

In the FIGURE 3 embodiment, a suspension of fibrous cellulose in water, is supplied through a pipe 31 to a fractionator or separator 32 such as that described in Patent No. 2,988,223 to separate a liquid suspension of particles into two fractions, one fraction containing particles of a size exceeding $5\mu$ and another fraction containing particles of a size of $5\mu$ and less. The contents of dry matter in the suspension supplied through the pipe 31 may, by way of example, be one percent. The two fractions are taken off from the fractionator 32 through pipes 33 and 34 respectively.

In the example under consideration, the fraction containing particles exceeding $5\mu$, may be of a concentration of 2 percent, and the other fraction be of a concentration of 0.2 percent.

The second fraction is supplied through the pipe 34 to a flotation device 35, for example, the plural flotation cell of Krofta described previously in which a preconcentration takes place in a known manner to a concentration of, for example, 3 percent. The water, practically free of particles, is lead away through pipe 36, and the concentrated suspension is supplied through the pipe 37, to a further preconcentration device 38, which may be of the filter press type. In one suitable press, the material to be concentrated is fed through a hopper at one end of the barrel of the screw press, and the concentrated material is removed at the other end of the press via an annular orifice. The water derived from said device, may comprise a slight amount of dry matter, for instance, less than 0.02 percent, and is lead back through a pipe 39 to the plant not shown in which the suspension supplied through pipe 31 is originally prepared.

The concentrated suspension having a content of 30 percent of dry matter, for example, is supplied through a pipe 40 to a granulator 41, and thereafter through a pipe 42 to an atomization drier 43, in which the final drying and agglomeration takes place.

Hot air is supplied through pipe 44 at a temperature in the order of 200° C. and air and vapors are vented through pipe 45, at about 85–95° C. and the dried agglomerated particles are removed from the bottom of drier 43 through pipe 48.

The air vented through pipe 45 contains a certain amount of particles, and is, therefore, lead to a cyclone separator 46, from which the air leaves through pipe 47, and the particles leave through the bottom, which is in connection with pipe 48. The combined particles from the tube 48 and from the bottom of the separator 46 are passed through pipe 49 to be added to a paper pulp in a paper machine.

Figure 3A:
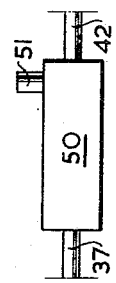
FIGURE 3a shows a modification of the plant shown in FIGURE 3.

FIGURE 3a shows a modification of part of the plant shown in FIGURE 3, in which an evaporative concentrator 50 is employed instead of the filter-press type preconcentration device 38, and the disintegrator 41.

The concentration of the suspension supplied through pipe 37 to the concentrator 50 is still 3 percent, whereas the suspension leaving through pipe 42 contains 8–10 percent of dry matter. The vapor taken off from the suspension during concentration leaves through tube 51.

Owing to the various concentrations of the suspension supplied to the device 43, in the two cases, the said device must be differently operated so as to obtain the desired agglomeration, or different types of atomization dryers, or other types of dryer may be used.

It is within the scope of those skilled in the art to operate an appropriate atomization dryer in such a manner that the particle size desired, is obtained. It is only a question of adjusting the atomizer, or, as the case may be, the preceding granulator, so that the aqueous particles are of a size corresponding to the desired particles in accordance with the concentration of the suspension, and, further, to adjust the temperature and the amount of the hot air in accordance with the amount of water to be evaporated, so that the particles are dried before they deposit on the bottom wall of the device.

In the following is, as an example, described a production performed on an industrial scale by means of a plant similar to that shown on FIGURE 3.

*Example*

The plant used was as that described with reference to FIGURE 3, only that the granulator 41 was omitted. Consequently, the pipes 40 and 42 were directly interconnected.

The atomization drier 43 was of a type available from A/S Niro Atomizer, Copenhagen, indicated as Type TS 33, with a drying chamber with a diameter of 5 meters, and an atomizer wheel of the vaned disc type, diameter 250 mms. driven at 12,000 r.p.m. by a 10 H.P. motor.

The suspension supplied to the fractionator through pipe 31, was an ordinary ground wood pulp.

The fraction taken off through pipe 33, as well as the product from tube 49 was supplied to the stock chest of the paper machine.

The following concentrations, rates, etc., were used or obtained at different points of the plant:

| Pipe | Concentration, percent | Contents of dried matter per hour, kgs. |
|---|---|---|
| 31 | 0.67 | 254 |
| 33 | 1.6 | 221 |
| 34 | 0.14 | 33 |
| 36 | 0.005 | 1 |
| 37 | 3 | 32 |
| 39 | 0.8 | 5 |
| 40 (42) | 6 | 27 |

In the atomization drier:

Air supplied through pipe 44 10,000 kgs. per hour, 210° C.

Pulp supplied through pipe 42 total 455 kgs. per hour.

Water evaporated in drier 425 kgs. per hour.

Air taken off through pipe 47 65–70° C.

Product delivered through pipe 49 30 kgs. per hour, contents of water 6 to 13%.

Practically the total amount of product was delivered from the cyclone, meaning that it was taken off from drier together with the air through pipe 45, whereas, practically no product was delivered directly from drier through pipe 48.

While preferred embodiments of the invention have been described, it is intended to encompass all changes and modifications that fall within the scope of the appended claims.

In the claims:

1. A method for the production of paper pulp from a dispersion of fibrous cellulose material in water, the steps comprising separating from said dispersion an aqueous fraction containing resins and crills of a size of about 5μ and less, atomizing said fraction to obtain dried agglomerated discrete particles larger than 5μ, and employing said dried agglomerated discrete particles for use in the production of paper pulp.

2. A method according to claim 1, further comprising regulating the atomizing step so that said dried agglomerated discrete particles have a size between about 50 and 100μ.

3. A method according to claim 2, further comprising forming a second aqueous fraction from said dispersion containing fibrous particles of a size greater than about 5 μ, drying said second aqueous fraction, and forming the fibrous particles of said second aqueous fraction into bales.

4. A method according to claim 3, further comprising combining said dried discrete particles with the particles from said second aqueous fraction prior to the bale forming step.

5. A method according to claim 1, wherein substantially all of said dried agglomerated discrete particles have a size of at least 5μ.

6. A method according to claim 1, wherein said dried agglomerated discrete particles are distributed onto a fibrous web upon the wire screen of a paper machine.

7. A method for the production of paper pulp from a dispersion of fibrous cellulose material in water, the steps comprising supplying said dispersion to a fractionating zone, separating said dispersion in said fractionating zone into a first aqueous fraction containing solid particles consisting primarily of fibrous particles having a size greater than about 5μ and into a second aqueous fraction containing solid particles of a size of up to about 5μ concentrating said second aqueous fraction in a concentrating zone, introducing the concentrated second fraction into a drying zone, and atomizing said concentrated second fraction in said drying zone to obtain dried agglomerated discrete particles having a size in excess of 5μ, and introducing said dried agglomerated discrete particles into a dispersion of fibrous cellulose material to be used for the production of the paper pulp.

8. In combination with apparatus for the production of paper pulp including a paper machine, the improvement comprising a fractionator for separating a dispersion of fibrous cellulose into a first fraction containing particles of a size primarily greater than 5μ, and a second fraction containing particles of a size up to about 5μ, said fractionator having a first outlet for said first fraction and a second outlet for said second fraction, a flotation device connected to said second outlet to concentrate said second fraction, a preconcentrator connected to the outlet from said flotation device for said second fraction to further concentrate said second fraction, and atomizing dryer means connected to said preconcentrator to dry and agglomerate the particles of the second fraction into larger discrete particles.

9. Apparatus according to claim 8, wherein said preconcentrator is a filter screw press, and further comprising a granulator operatively connected between said filter screw press and said drier.

References Cited

UNITED STATES PATENTS

| | | | |
|---|---|---|---|
| 1,786,681 | 12/1930 | Traquair | 162—184 |
| 3,047,453 | 7/1962 | Shook | 162—100 |
| 3,055,795 | 9/1962 | Eberhardt | 162—100 |
| 3,143,428 | 8/1964 | Reimers et al. | 159—48 |

FOREIGN PATENTS 606,684 10/1960 Canada.

OTHER REFERENCES

Perry J. H., Chemical Engineer's Handbook, 3rd edition, 1950, McGraw-Hill Book Co., New York, p. 842 (copy in Gr. 170).

S. LEON BASHORE, *Primary Examiner.*